United States Patent
Demers et al.

(10) Patent No.: US 6,515,617 B1
(45) Date of Patent: Feb. 4, 2003

(54) METHOD AND SYSTEM FOR POSITION DETERMINATION USING GEOSTATIONARY EARTH ORBIT SATELLITE

(75) Inventors: Stephanie Demers, Rockville, MD (US); Michael Parr, Hermosa Beach, CA (US); Anthony Noerpel, Lovettsville, VA (US); Dave Roos, Boyds, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/200,133

(22) Filed: Nov. 25, 1998

Related U.S. Application Data

(60) Provisional application No. 60/098,664, filed on Sep. 1, 1998.

(51) Int. Cl.$^7$ .............................. H04B 7/185; G01S 5/02
(52) U.S. Cl. .................. 342/357.01; 342/356; 342/352
(58) Field of Search ............................ 342/357.01, 356, 342/352

(56) References Cited

U.S. PATENT DOCUMENTS

| | | | |
|---|---|---|---|
| 5,148,179 A | 9/1992 | Allison | 342/357 |
| 5,589,834 A | 12/1996 | Weinberg | 342/354 |
| 5,666,647 A | 9/1997 | Maine | 455/12.1 |
| 5,907,809 A * | 5/1999 | Molnar et al. | 455/456 |

FOREIGN PATENT DOCUMENTS

| | | |
|---|---|---|
| EP | 0 662 758 A2 | 7/1995 |
| EP | 0 876 007 A2 | 11/1998 |
| GB | 2 303 764 A | 2/1997 |
| WO | WO 95/19094 | 7/1995 |
| WO | WO 96/21332 | 7/1996 |
| WO | WO 98/12571 | 3/1998 |

* cited by examiner

*Primary Examiner*—Theodore M. Blum
(74) *Attorney, Agent, or Firm*—John T. Whelan; Michael W. Sales

(57) ABSTRACT

A system (20) and method (30) for estimating the location of a terrestrial-based user terminal (23) is provided. The user terminal (23) is capable of measuring the relative signal strengths of a plurality of spot beams pilot signal emitted from a geostationary satellite (22). The user terminal (23) then estimates its position based on the measured relative signal strengths. Using this approach, the user terminal (23) can quickly determine its location without prior knowledge of its position or delay time.

2 Claims, 5 Drawing Sheets

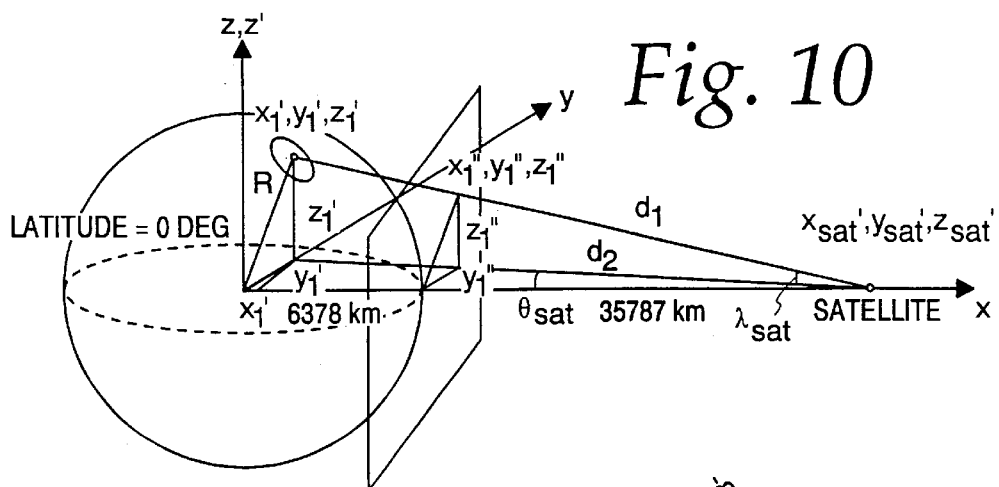
*Fig. 10*
*Fig. 11*
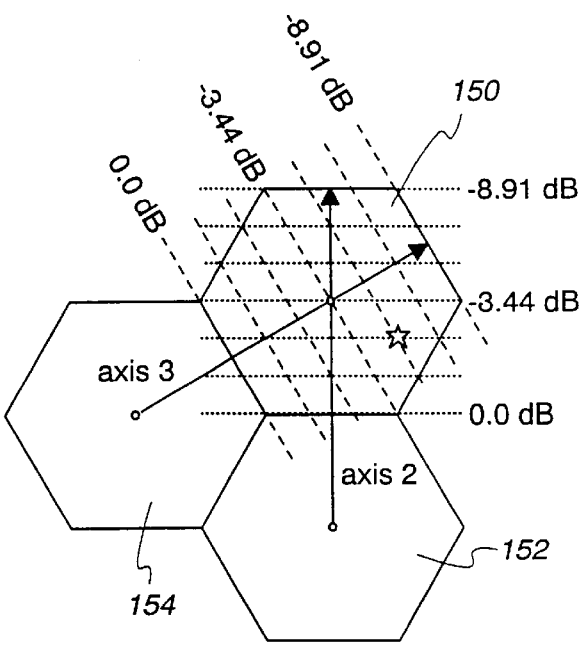
- ········ : SPOT BEAM 2
- ----- : SPOT BEAM 3
- ☆ : UT LOCATION
- ○ : SPOT BEAM CENTER
*Fig. 12*
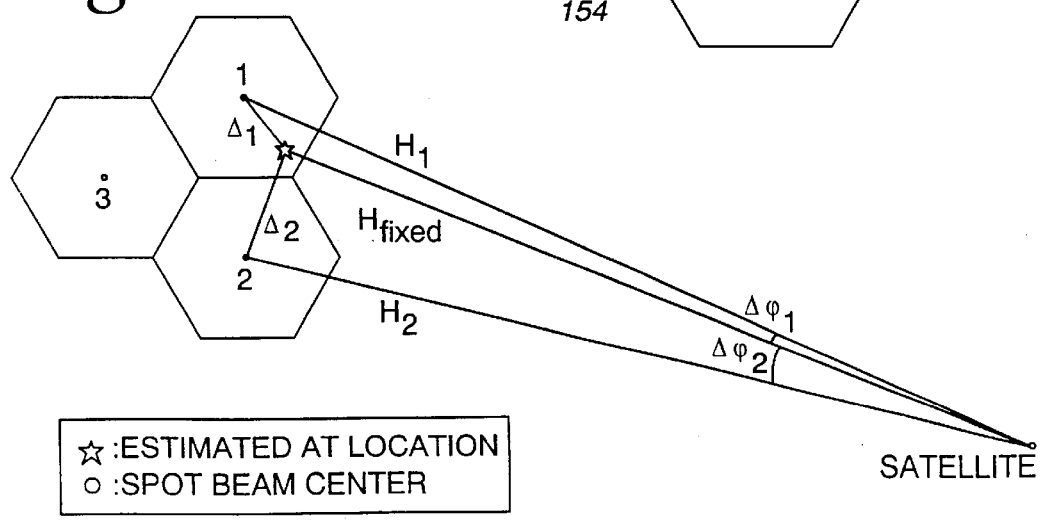
- ☆ : ESTIMATED AT LOCATION
- ○ : SPOT BEAM CENTER

METHOD AND SYSTEM FOR POSITION DETERMINATION USING GEOSTATIONARY EARTH ORBIT SATELLITE

CROSS-REFERENCE TO RELATED APPLICATIONS

This application claims priority under 35 U.S.C. §119(e) from co-pending U.S. Provisional Application No. 60/098,664 filed Sep. 1, 1998. The present invention also is related to a currently pending patent application titled "Spot Beam Selection in a Mobile Satellite Communication System", Ser. No. 09/115,096, filed on Jul. 13, 1998, the subject matter of which is hereby incorporated by reference.

TECHNICAL FIELD OF THE INVENTION

The present invention relates generally to position estimation using a satellite system, and in particular, to a method and system for determining the location of a terrestrial-based terminal using pilot signals emitted by a geosynchronous earth orbit satellite.

BACKGROUND OF THE INVENTION

A conventional position determination can be accomplished using the Global Positioning System (GPS). In the GPS, a plurality of earth orbiting satellites transmit coded radio signals. Earth-based receivers of these signals are capable of determining their positions in an earth-centered coordinate reference system utilized by the GPS. Relying on four GPS satellites, a terrestrial-based receiver can estimate its location to within a few meters rapidly if its initial GPS position and timing delay estimates are known. However, if such initial estimates are not available, it may take up to one minute for the GPS receiver to acquire its position from the GPS signals. Accordingly, there is a need to improve the speed with which initial user location is acquired.

In addition, accurately determining the position of a mobile user permits an accurate estimation of the round-trip transmission delay between the user terminal and the satellite. Time delay estimations are important in time division multiple access (TDMA) satellite communication systems, such as the Geosynchronous Earth Orbit Mobile Satellite System, i.e., the Geo Mobile (GEM) system. In radio frequency (RF) TDMA communication systems, user terminals transmit message bursts at predetermined times corresponding to time slots. To ensure that its burst reaches the satellite at the correct time, a user terminal must determine its "timing", i.e., when it should transmit, which is a function of the transmission delay. Also, as part of determining its timing, a user terminal must request a time slot assignment from the system prior to establishing a communications link. User terminals can transmit time slot requests during a random access channel (RACH) window. The RACH window is a predetermined interval defined by the system to occur following each regular transmission of a RACH indicator message by the satellite over a broadcast control channel (BCCH). In response to the RACH indicator, a user terminal may transmit its request during the RACH window, which opens at a predetermined time after the RACH indicator.

The duration of the RACH window depends upon the accuracy of the user terminal delay estimations. Accurate delay estimations allow a system to operate with a smaller RACH window. In turn, this permits the system to dedicate more time slots to message bursts, thus increasing the effective capacity of the communication system.

In a communication system such as GEM, a user terminal is in communication with only one geosynchronous satellite at a time. Consequently, only one satellite is available to a GEM user to perform location acquisition. Thus, there is a need for a method and system capable of determining a user position based on transmissions from a single geostationary satellite.

SUMMARY OF THE INVENTION

It is an advantage of the present invention to provide a method and system for determining position using the relative signal strengths of a plurality of pilot signals defining spot beams emitted by a single geosynchronous satellite. Another advantage of the present invention is that it allows a user terminal to determine its position without any prior knowledge of its position or delay timing. A further advantage of the present invention is that it can acquire an accurate position estimate in less than three seconds, which can then be used to determine timing delay.

The novel method and system embodying the invention and disclosed herein can include a user terminal (UT) capable of estimating its position using pilot signal relative power measurements of at least three spot beams emitted by a satellite in geosynchronous orbit. Each spot beam corresponds to a respective pilot signal. Also, the pilot signals can be emitted using a phased array antenna included on the satellite.

The UT performs its location determination by comparing estimated relative strengths of the pilot signals to one or more actual relative signal strengths measured at the UT. To estimate relative signal strengths, the UT first obtains the location of the spot beam centers and the satellite from system information carried by the pilot signals. With this information and the attenuation pattern of the satellite antenna, the UT can estimate the relative strength of the pilot signals at corresponding points within the region where the UT resides. Between two or more spot beams, the estimated relative signal strength can be iteratively computed until it converges to the measured relative pilot signal strength. After convergence, the location within the region corresponding to the estimated relative signal strength can represent the approximate location of the UT.

Because a UT in accordance with an embodiment of the invention relies on the relative strength of pilot signals from a single satellite, it does not require prior knowledge of the UT timing or position to determine the UT location. Moreover, since no prior knowledge of location or timing is necessary, the UT can quickly determine its location from a cold start, relative to the acquisition time required by a GPS receiver.

In addition, in contrast to terrestrial-based RF communication systems, such as cellular subscriber systems, a communication system embodying the invention relies on pilot signals emitted from a single source, i.e., a phased array antenna of a satellite. Accordingly, the relative signal strengths are a primarily a function of the shape of the beam emitted by the antenna, rather than the physical distance between RF repeaters.

Furthermore, because the measured pilot signals are emitted from a single source, they take the same path from the satellite to the UT. Consequently, environmental conditions, such as weather, uniformly effect the strength of the pilot signals received at the UT. Since each pilot signal is similarly effected, the relative signal power measured by the UT remains largely unaffected with changes in environment. This permits the UT to accurately determine its location with significantly reduced susceptibility to variations in its usage environment.

The position estimation by the UT can be accomplished using the Geo Mobile (GEM) system. The location determination is useful for: 1) facilitating the Global Positioning System (GPS) position fix; and 2) estimating the differential round-trip delay among the actual user terminal position, the satellite, and the round-trip delay reported in the pilot signal system information to the center of the spot beam. Determining the approximate UT position reduces GPS position acquisition time; while determining the UT delay time allows the GEM system to operate more efficiently.

BRIEF DESCRIPTION OF THE DRAWINGS

FIG. 10 illustrates the transformation of a spot beam from the earth's surface to a plane perpendicular to the satellite radius;

FIG. 11 illustrates a cluster of spot beams and relative signal strengths mapped onto the plane; and FIG. 12 graphically illustrates the distances and angles used in estimating the planar location of the user terminal.

DETAILED DESCRIPTION OF EMBODIMENTS OF THE INVENTION

It will be understood that both the foregoing general description and the following detailed description are exemplary and intended to provided further explanation of the invention as claimed.

Figure 1:
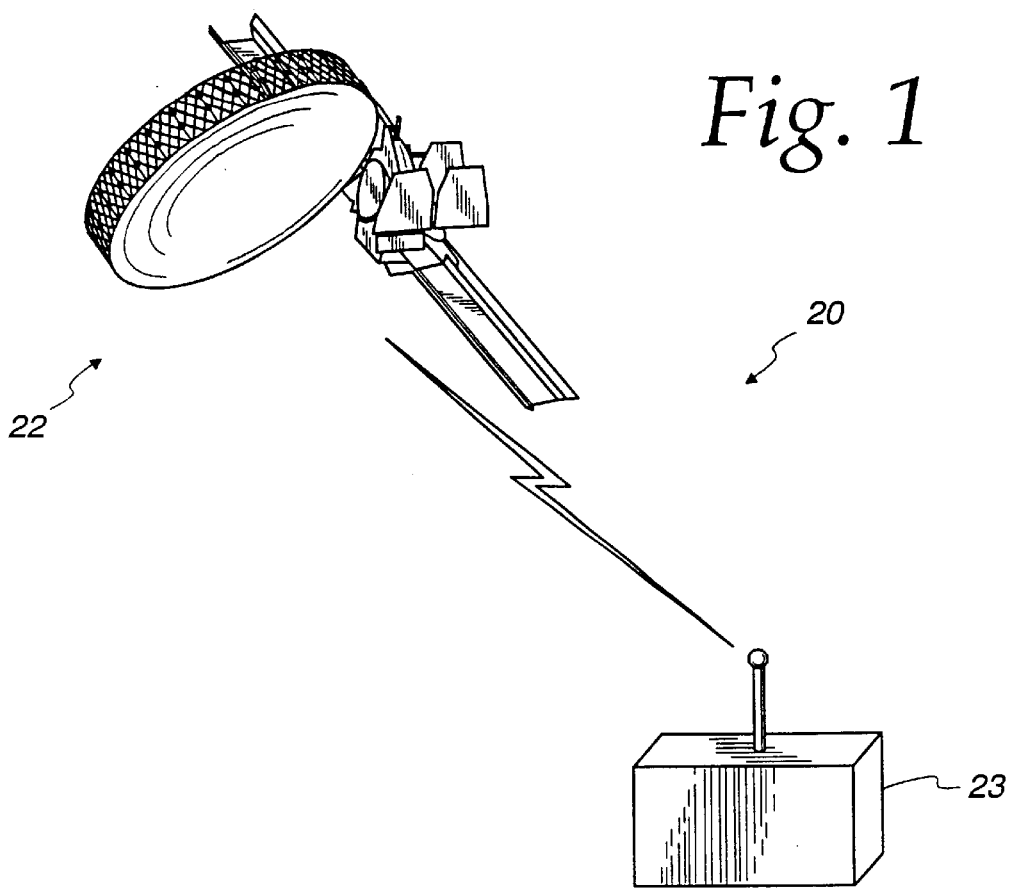
FIG. 1 illustrates a satellite system in accordance with one embodiment of the present invention.

Turning now to the drawings, and in particular to FIG. 1, there is illustrated a satellite system in accordance with one embodiment of the present invention. The system 20 includes a terrestrial-based user terminal (UT) 23 in radio frequency (RF) communication with a satellite 22 having a substantially geosynchronous orbit. The UT 23 can be a mobile handset or any other device suitable for satellite communications. The satellite 22 can be a geostationary communication satellite having a phased array antenna (not shown) capable of emitting a plurality of spot beams onto the surface of the earth, such as a satellite included in the GEM system.

Included in each spot beam transmission is a pilot signal. Each pilot signal can include a carrier having a unique frequency, permitting it to be identified from among the other pilot signals. System information, such as the satellite position, spot beam center positions, broadcast control channel (BCCH) information, satellite antenna parametric information, and the like, can be modulated onto the pilot signals.

In the system 20, the satellite 22 is in nominal geostationary orbit and consequently appears almost stationary relative to the earth as opposed to a low earth-orbit satellite system. The satellite 22 is located at approximately 35787 km from the surface of the earth. At that altitude, it is permissible to assume a spherical earth with a radius of 6378 km and ignore the altitude of the UT on earth.

Figure 7:
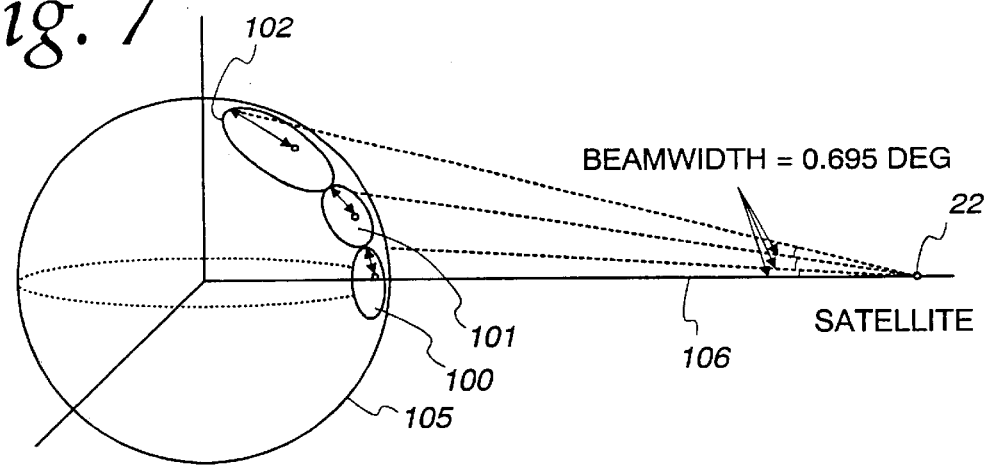
FIG. 7 illustrates the projection of spot beams onto the surface of the earth.

As shown in FIG. 7, spot beams 100–102 in the system have the shape of cones emitted from the satellite 22. The projection of these cones on the earth 105 forms the area served by the beams. From the satellite perspective, all spot beams are about 0.695° in diameter, i.e., about 0.695° apart from their nearest neighbor if the satellite orbit is not inclined with respect to the celestial equator. However, because the satellite moves in a predetermined course from about 6° and −6° declination through the day due to inclined orbit operation, at the satellite antenna the transmitted beamwidth will vary in a predetermined manner to maintain a substantially constant beam "footprint" on the ground. Maintaining a constant footprint maintains a fixed service area for each of the spot beams. The beamwidths can be varied by the satellite by adjusting coefficients values used by the phased array antenna. These values can be precomputed and stored in a lookup table that is accessed at regular intervals based on the orbit of the satellite.

Although the spot beam footprints define service areas, RF energy of a particular spot beam invariably passes into footprint areas of neighboring spot beams. Thus, RF signals of one spot beam can be received in the service area of other spot beams, but at a much lower power level. This permits the UT 23 to measure the power levels of the pilot signals of neighboring spot beams.

Because of the earth's curvature, spot beams illuminate an area on the ground have diameters that increase with displacement from the subsatellite point.

Figure 8:
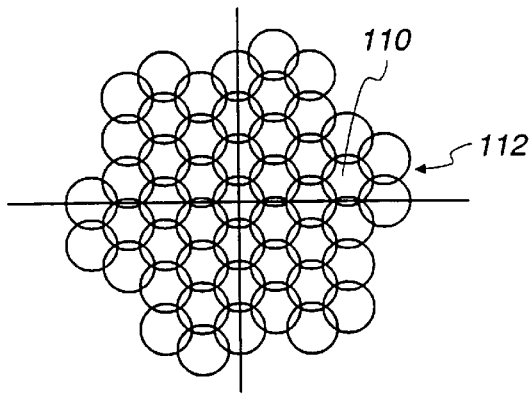
FIG. 8 illustrates spot beams projected onto a plane perpendicular to a satellite radius.

As shown in FIG. 8, when the spot beam illumination areas on earth are projected onto a plane perpendicular to the satellite radius, they are all approximately equivalent in size and shape, independent of inclined orbit operation. Mathematically transforming spot beam areas such that they have equivalent dimensions is important because it permits the attenuation pattern of the spot beam to be accurately modeled.

Figure 2:
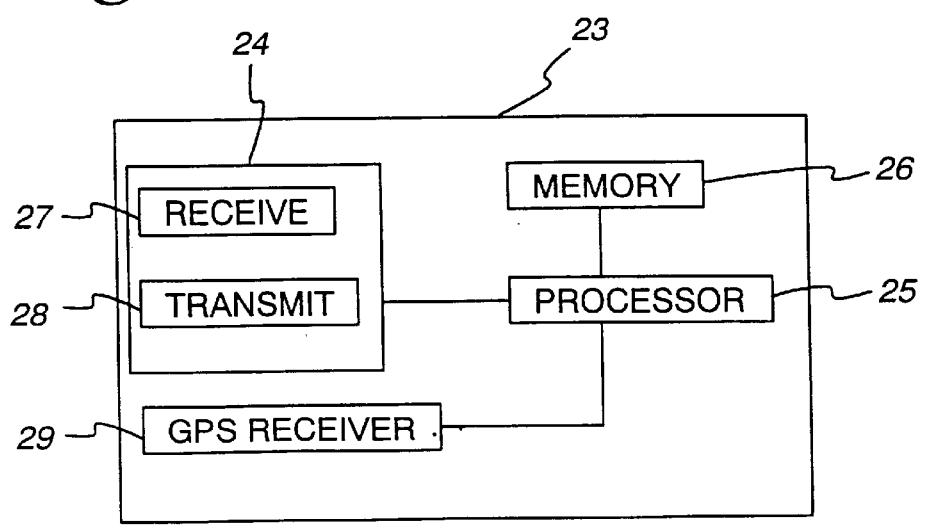
FIG. 2 illustrates a detailed block diagram of the user terminal shown in FIG. 1.

FIG. 2 illustrates a detailed block diagram of the UT 23 shown in FIG. 1. The UT 23 can include a conventional transceiver 24 permitting the UT 23 to communicate with the satellite 22 over an RF channel. The UT 23 can also include a conventional GPS receiver 29, a processor 25, and a computer memory 26.

The transceiver 24 includes a receiver 27 and a transmitter 28. The receiver 27 includes conventional circuitry for converting RF signals received from the satellite into digital data suitable for use by the processor 25, such as a conventional quadrature phase shift keying (QPSK) receiver for satellite communications. The receiver 27 also includes conventional circuitry for measuring the strength of incoming RF signals and for decoding satellite system information from the incoming RF signals. The receiver 27 can provide digitized representations of the system information and signal strengths to the processor 25.

The power levels of the incoming pilot signals can be measured by time averaging the strength of their respective carrier signals.

The processor 25 can be any electronic device capable of performing computations using the data provided by the receiver 27. The processor 25 can include a general-purpose computer, a microprocessor, a digital signal processor (DSP), or an application specific integrated circuit (ASIC) specifically designed to perform position estimation as disclosed herein.

The memory 26 can store a set of executable instructions for directing the processor 25 to estimate the position of the terminal 23 based on the measured relative signal strengths and system information provided by the receiver 27. The algorithm embodied by these instructions is depicted by the flowcharts in FIGS. 3–6.

Figure 3:
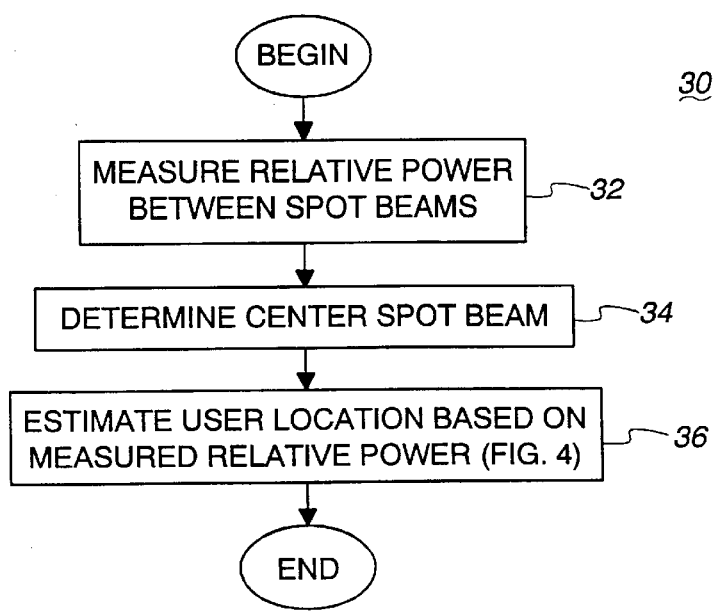
FIG. 3 is a flowchart diagram illustrating a method of estimating the location of a user terminal in accordance with another embodiment of the present invention.

Referring to FIG. 3, there is shown a method 30 for estimating the position of the UT 23 in accordance with an embodiment of the present invention. The method 30 can be included as a function of the processor 25.

In step 32, the UT 23 measures the relative signal power, i.e., strength, between a plurality of spot beams neighboring each other. In step 34, a center spot beam is selected from among the plurality of spot beams emitted by the satellite 22. Details of how the power measurement and selection steps are performed are provided in the Related Application titled "Spot Beam Selection in a Mobile Satellite Communication System", Ser. No. 09/115,096, incorporated herein by reference. In essence, at the satellite, each spot beam is emitted from the antenna at a predetermined power level. The emitted power level of each spot beam can be substantially equal. In such an instance, the center spot beam will have the greatest pilot signal strength, as measured at the UT 23. The UT 23 is located somewhere within the center spot beam. Next, in step 36, the UT 23 estimates its location on the earth based on the measured relative signal strengths of the spot beams. Details of this estimation process are shown in FIG. 4.

Figure 4:
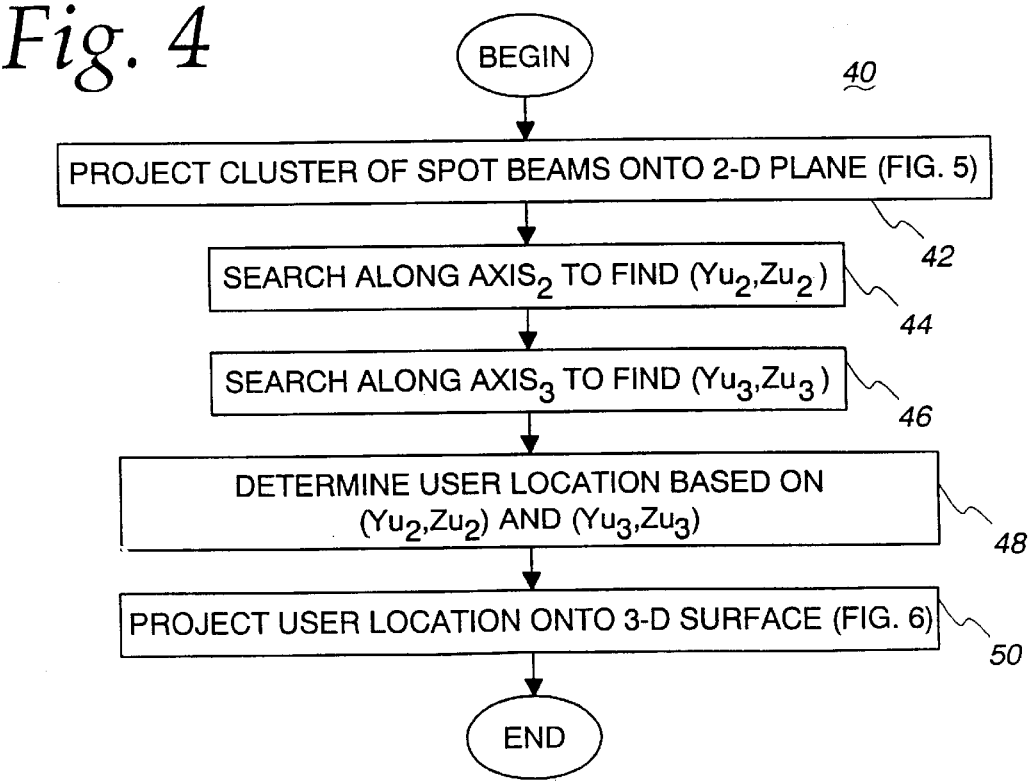
FIGS. 4–6 show flowchart diagrams depicting the details of the method shown in FIG. 2.

As shown in FIG. 4, a method 40 carries out the position estimation procedure of step 36. This position estimate method can use the relative power measurements of three beams at a time. In addition, it can calculate approximate locations for one to twelve combinations of three spot beams, depending on the number of neighbors in the cluster. It then averages these approximate locations to get the final averaged approximate location.

Averaging the UT positions determined with different spot beam combinations reduces error caused by slight, statistical variation in the power level of each spot beam caused by the satellite transmitter.

As illustrated in FIG. 8, a cluster typically includes a center spot beam 110 and six neighboring spot beams 112. Each combination in the cluster includes the center spot beam and two neighboring beams. The combinations of beams can be mapped onto a 2-D plane perpendicular to the subsatellite point. On this new plane, the spot beams have approximately equivalent dimensions. By mapping the spot beams to a surface such that they have substantially equivalent dimensions, the antenna attenuation pattern used to create the beams can be more accurately modeled mathematically. This improves the overall accuracy of the UT position estimation.

Although mapping to a 2-D plane is described in detail herein, such description is exemplary, and it will be readily apparent to one of ordinary skill in the art that any surface, such as a unit sphere surrounding the satellite, which permits the spot beams to mapped thereto having approximately equivalent dimensions, can be used. In addition, the position of the UT can be determined in accordance with an embodiment of the invention without mapping the spot beams to a surface other than the earth's.

Figure 9:
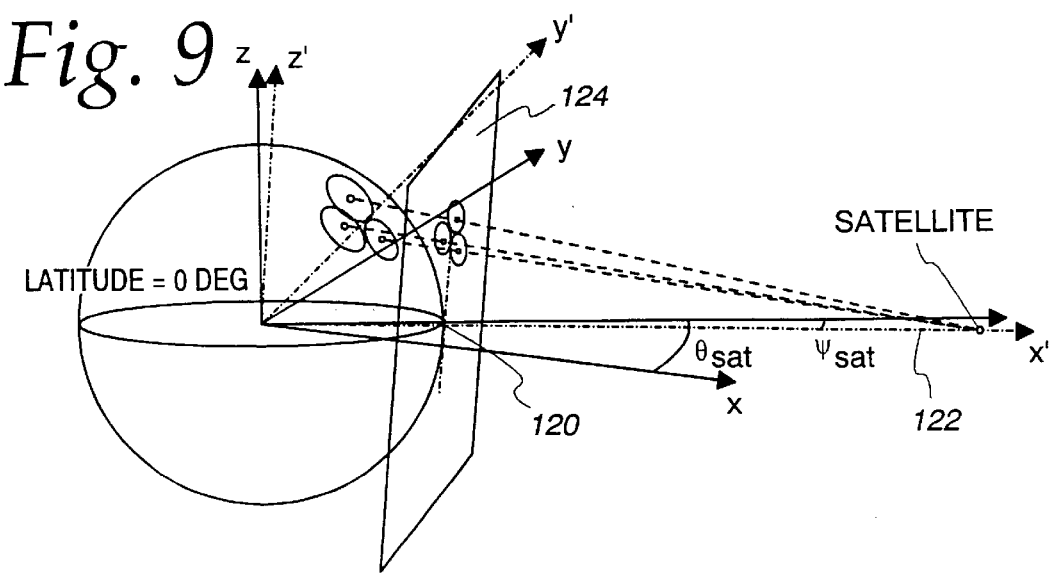
FIG. 9 illustrates a coordinate axis system defining the locations of the earth, satellite, and spot beams.

However, to increase the accuracy of the position acquisition, a combination of three spot beams can be projected onto the 2-D plane (step 42). Several transformations are performed to map the spot beams onto a plane perpendicular 124 to the satellite radius (x' axis) and centered around the subsatellite point 120 as shown in FIG. 9.

After mapping the three-beam cluster to the 2-D plane, as depicted in FIG. 11, a search along $axis_2$ is performed to locate a point where an estimated relative signal strength between the center spot beam 150 and a first neighboring spot beam 152 in equal to that actual measured by the UT 23 (step 44). As illustrated in FIG. 11, $axis_2$ is a line connecting the centers of the center beam 150 and first spot beam 152. The dashed and dotted lines in FIG. 11 represent an approximation of the loci of points having equal relative signal strength. The search along $axis_2$ can be based on the relative strengths of the pilot signals of the center and first spot beams. Specifically, the search is performed by iteratively generating estimated relative signal strengths corresponding to different points along $axis_2$, and then comparing the estimated relative strengths to the actual relative signal strength measured by the UT 23. The iteration continues until the estimated relative strength converges to the measured relative strength. The coordinates on the $axis_2$ resulting from this step are represented by $(y_{u2}, z_{u2})$. The algorithm for performing this search is described in detail below.

In step 46, a second search is performed along $axis_3$ to find the point between the center spot beam 150 and a second neighboring spot beam 154 at which the estimated and measured relative signal strengths are substantially equal. $Axis_2$ is a line connecting the centers of the center beam 150 and second spot beam 154. The second search is performed in the same manner as described above for $axis_2$. The coordinates on the $axis_3$ resulting from this step are represented by $(y_{u3}, z_{u3})$.

In step 48, the UT position is determined based on the coordinates found along $axis_2$ and $axis_3$. The iterative algorithm for performing steps 44–48 is described in detail below.

In step 50, the location of the UT 23 on the 2-D plane is projected onto the 3-D surface of the earth. Details of this step are given in FIG. 6.

Figure 5:
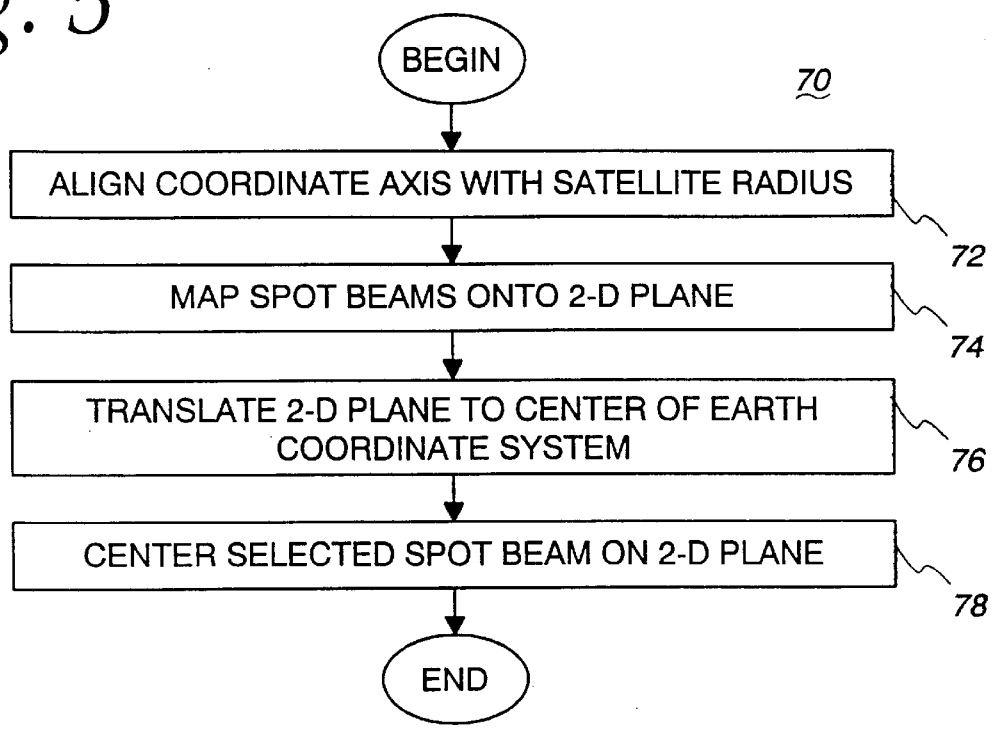

In FIG. 5, there is shown a method 70 for projecting the spot beams onto a 2-D plane tangential to the subsatellite spot 120. The spot beams are projected so that they are approximately equivalent in dimensions on the plane. As mentioned above, such a projection of the 3-D spot beams onto the 2-D plane requires several mathematical transformations.

The first transformation rotates the earth-centered earth-fixed (ECEF) coordinate system, defined by the x, y, and z axes shown in FIG. 9, by $\theta_{sat}$ and $\Psi_{sat}$ such that the new coordinate system (x', y', z') has its x'-axis aligned with the satellite radius that passes through the subsatellite point (step 72). The ECEF coordinate system is predefined, with the axes perpendicular to one another. The current position of the satellite relative to this coordinate system is predetermined by satellite tracking stations. Accordingly, knowing of the current satellite position $(x_{sat}, y_{sat}, z_{sat})$, the angles $\theta_{sat}$ and $\Psi_{sat}$ can be computed according to Eqs. 7–8.

To accomplish the rotation, the x-axis and y-axis of the ECEF system are rotated by osat, and the x-axis and z-axis are rotated by $\Psi_{sat}$. The transformed axes remain perpendicular to one another.

If the satellite has no inclined orbit, $\Psi_{sat}$ is the angle between the x-axis and the satellite radius x' passing through the subsatellite point, and $\Psi_{sat}$ is equal to zero. Following step 72, only the coordinates of the spot beams are moved around while the coordinate system remains fixed at (x', y', z').

The second transformation projects the beams on earth to the 2-D plane, which intersects and has its origin at the subsatellite point (step 74). After this step, the spot beams are located on the 2-D plane, offset from the center of the plane.

To further simplify the problem, two additional transformations are performed. The cluster of three spot beams is translated on this 2-D plane such that the center spot beam is located at the center of the plane (step 78). This improves the equivalency of the spot beams. In addition, the plane is translated such that the center of the plane corresponding to the subsatellite point matches the coordinates of the center of the earth (step 76). This step eliminates the x axis coordinate of the spot beam locations.

With these four transformations, the number of unknowns is reduced by one: y and z being the unknowns and x being now equal to zero for all three spot beams. The following describes the mathematics required by the four steps to map three spot beams onto the 2-D plane.

As a general notation rule for the equations and figures described herein, (x, y, z), (x', y', z'), etc., without subscripts represent axes, while $(x_i, y_i, z_i)$, $(x_i', y_i', z_i')$, etc., represent spot beam coordinates.

In step 72, the earth-center coordinate system is rotated to align with the satellite radius passing through the subsatellite spot 120. The axes (x, y, z) are rotated by $\theta_{sat}$ and $\Psi_{sat}$ such that the satellite radius (x' axis) is aligned with the x-axis, as shown in FIG. 10. The coordinates of the three spot beam$_i$ (i=1, 2, 3) centers and the satellite become:

$$x_i' = (x_i \cos(\theta_{sat}) + y_i \sin(\theta_{sat}))\cos(\psi_{sat}) + z_i \sin(\psi_{sat}) \quad (1)$$

$$y_i' = y_i \cos(\theta_{sat}) - x_i \sin(\theta_{sat}) \quad (2)$$

$$z_i' = z_i \cos(\psi_{sat}) - (x_i \cos(\theta_{sat}) + y_i \sin(\theta_{sat}))\sin(\psi_{sat}) \quad (3)$$

$$x_{sat}' = (x_{sat} \cos(\theta_{sat}) + y_{sat} \sin(\theta_{sat}))\cos(\psi_{sat}) + z_{sat} \sin(\psi_{sat}) \quad (4)$$

$$y_{sat}' = y_{sat} \cos(\theta_{sat}) - x_{sat} \sin(\theta_{sat}) \quad (5)$$

$$z_{sat}' = z_{sat} \cos(\psi_{sat}) - (x_{sat} \cos(\theta_{sat}) + y_{sat} \sin(\theta_{sat}))\sin(\psi_{sat}) \quad (6)$$

Where $$\theta_{sat} = a\tan(y_{sat}/x_{sat}) \quad (7)$$

$$\psi_{sat} = a\tan(z_{sat}/\sqrt{x_{sat}^2 + y_{sat}^2}) \quad (8)$$

In step 74, the cluster of spot beams is mapped onto the 2-D plane. The angles and distances used in for this mapping are illustrated in FIG. 10. The mapping is accomplished by locating the center of each spot beam$_i$ (i=1, 2, 3) on the 2-D plane. The satellite position does not change during this transformation.

The angle between the satellite and the center of spot beam$_i$ (i=1, 2, 3) is found by:

$$\lambda_{sat_i} = a\sin\left(\frac{z_i'}{d_1}\right) \quad (9)$$

$$\phi_{sat_i} = a\cos\left(\frac{d_2^2 + (R+H)^2 - (x_i'^2 + y_i'^2)}{2d_2(R+H)}\right) \quad (10)$$

Where $$d_1 = \sqrt{(x_{sat}' - x_i')^2 + (y_{sat}' - y_i')^2 + (z_{sat}' - z_i')^2} \quad (11)$$

$$d_2 = \sqrt{(x_{sat}' - x_i')^2 + (y_{sat}' - y_i')^2 + (z_{sat}')^2} \quad (12)$$

Check if $x_i$ or $y_i$ is negative. If yes, $$\phi_{sat_i} = -\phi_{sat_i} \quad (13)$$

The locations of the centers of spot beam$i$ (i=1, 2, 3) on the 2-D plane are given by Eqs. 14–16.

In step 76, the x coordinate of spot beam$i$ (i=1, 2, 3) center and the satellite are translated by 6378 km to locate the plane at the center of the earth coordinate system. Eqs. 17–19 represent the transformed location of the satellite.

$$x_i'' = 0 \quad (14)$$

$$y_i'' = H \tan(\phi_{sat_i}) \quad (15)$$

$$z_i'' = \sqrt{H^2 + y_i''^2} \tan(\lambda_{sat_i}) \quad (16)$$

$$x_{sat}'' = x_{sat}' - R \quad (17)$$

$$y_{sat}'' = y_{sat}' \quad (18)$$

$$z_{sat}'' = z_{sat}' \quad (19)$$

where R=6378 km; H=35787 km; $\phi_{sati}$, $\lambda_{sati}$, $d_1$ and $d_2$ are depicted in FIG. 10.

In step 78, the coordinates of the center of spot beam$i$ (i=1, 2, 3) and the satellite are translated such that the center of the plane concords with the center of the center spot beam $(y_1, z_1)$. This is accomplished as follows:

$$y_i''' = y_i'' - y_1'' \quad (20)$$

$$z_i''' = z_i'' - z_1'' \quad (21)$$

$$x_{sat}''' = x_{sat}'' \quad (22)$$

$$y_{sat}''' = y_{sat}'' - y_1'' \quad (23)$$

$$z_{sat}''' = z_{sat}'' - z_1'' \quad (24)$$

The 3-D position acquisition problem is now reduced to a 2-D problem with two unknowns y''' and z'''. On this new plane, the UT can now search for its location efficiently with the least amount of computations. The UT will first search on this plane, as shown in FIG. 11, along the axis$_2$, joining spot beam$_1$ and spot beam$_2$, for a point $(y_{u2}, z_{u2})$ The point $(y_{u2}, z_{u2})$ represents the location on axis$_2$ Where the relative power between spot beam$_1$ and spot beam$_2$ estimated by the iterative algorithm is substantially equal to that measured by the UT 23. The UT 23 will then repeat the same iterative search between spot beam$_1$ and spot beam$_3$. The UT will search along axis$_3$, joining spot beam$_1$ and spot beam$_3$, for a point $(y_{u3}, z_{u3})$ with an estimated relative power equal to the actual relative power measured between spot beam$_1$ and spot beam$_3$.

Conceptually, the location of the UT is at the intersection of two lines perpendicular to axis$_2$ and axis$_3$, respectively. Specifically, drawing a first line perpendicular to axis$_2$ at point $(y_{u2}, z_{u2})$, and a second line perpendicular to axis$_3$ point $(y_{u3}, z_{u3})$ will yield intersecting lines. The intersection of the two lines represents an estimate of the user terminal position.

The following iterative algorithm is used to perform the above-described searches. These searches estimate the user terminal position once the steps 72–78 have been completed.

The notation conventions used in describing this algorithm are:

1) The center spot beam is referred as spot beam$_1$.
2) The coordinates of the center of spot beam$_i$ (i=2, 3) are denoted y'''$_i$ and z'''$_i$.
3) The relative power, i.e., strength, measured between spot beam$_1$ and spot beam$_i$ (i=2, 3) is referred as max$_i$_power_level.
4) The estimated relative power between spot beam$_1$ and spot beam$_i$ (i=2, 3) calculated by the algorithm is referred as diff_power$_i$.
5) The coordinates of the point along axis$_2$ with estimated relative power (diff_power$_2$) equivalent to the measured relative power (max$_2$_power_level) are denoted y$_{u2}$ and z$_{u2}$. Similarly, the coordinates of the point along axis$_3$ with estimated relative power (diff_power$_3$) equivalent to the measured relative power (max$_3$_power_level) are denoted y$_{u3}$ and z$_{u3}$.
6) The initial values for the estimated relative signal strengths along axis$_2$ and axis$_3$ are represented by minimum_power_level$_2$ and minimum_power_level$_3$, respectively. These initial values are predetermined to reflect the relative power at the center of spot beam$_1$. As shown in FIG. 11, this value can be −3.41 dB for an ideal beamwidth of 0.695°. However, the initial values can vary depending on the satellite orbit, antenna characteristics, attenuation pattern, and the like.

The algorithm is performed twice: once for axis$_2$ (i=2), and once for axis$_3$ (i=3).

The algorithm begins by initializing the following variables:

increment=1.0;
increment$_1$=0.0;
minimum_power_level$_2$ and minimum_power_level$_3$ are set to the estimated relative strengths at the center spot beam$_1$;
diff_power$_2$=diff_power$_3$=100.0;
max$_2$_power_level=measured relative signal strength between spot beam$_1$ and spot beam$_2$;
max$_3$_power_level=measured relative signal strength between spot beam$_1$ and spot beam$_3$.

The search begins by determining whether the UT is in the half of the center spot beam closer to spot beam$_i$, or the half farther away from spot beam$_i$. This is accomplished by comparing the initial estimated relative signal strength to the measured relative strength, as shown by the following if-then-else construct (Eqs. 25–26). Since the center of spot beam$_1$ is located at the origin (0, 0), the effect of the if-then-else construct is to begin the search in the quadrant opposite the location of spot beam$_i$ if the measured relative strength is less than the initial relative strength at the center of spot beam$_1$.

if (minimum_power_level$_i$ □ max$_i$_power_level)

$$y'''_{ui}=y'''_i/2;\ z'''_{ui}=z'''_i/2 \quad (25)$$

else $$y'''_{ui}=-y'''_i/2;\ z'''_{ui}=-z'''_i/2 \quad (26)$$

Next, a WHILE loop containing the following calculations is iteratively executed. The loop calculates an estimated relative signal strength and compares it to the measured relative signal strength. The loop continues while the measured and estimated signal strengths are not equal. Execution of the WHILE loop for i=2 and i=3 results in coordinates (y'''$_{u2}$, z'''$_{u2}$) and (y'''$_{u3}$, z'''$_{u3}$), which indicate points on axis$_2$ and axis$_3$, respectively, at which the estimated relative signal strength equals the measured relative signal strength. From these coordinates, the location of the UT can be determined. The WHILE loop is as follows:

WHILE (max$_i$_power_level !=diff_power$_i$)
{

$$y'''_{ui}=y'''_{ui}+y'''_i*\text{increment}_1 \quad (27)$$

$$z'''_{ui}=z'''_{ui}+z'''_i*\text{increment}_1 \quad (28)$$

$$H_{fixed} = \sqrt{x'''^2_{sat} + (y'''_{sat} - y'''_{ui})^2 + (z'''_{sat} - z'''_{ui})^2} \quad (29)$$

$$H_1 = x'''^2_{sat} + y'''^2_{sat} + z'''^2_{sat} \quad (30)$$

$$\Delta_1 = y'''^2_{ui} + z'''^2_{ui} \quad (31)$$

$$\Delta\varphi_1 = \mathrm{acos}\left(\frac{H_1^2 + H_{fixed}^2 - \Delta_1^2}{2*H_1*H_{fixed}}\right) \quad (32)$$

$$H_i = \sqrt{x'''^2_{sat} + (y'''_{sat} - y''_i)^2 + (z'''_{sat} - z''_i)^2} \quad (33)$$

$$\Delta_i = \sqrt{(y'''_i - y'''_{ui})^2 + (z'''_i - z'''_{ui})^2} \quad (34)$$

$$\Delta\varphi_i = \mathrm{acos}\left(\frac{H_i^2 + H_{fixed}^2 - \Delta_i^2}{2*H_i*H_{fixed}}\right) \quad (35)$$

If $\Delta\overline{\omega}_1$=0, then
{
$\Delta D_1$=0
else $$\Delta D_1 = 10*\log\left[\left(\frac{\sin\left(\frac{2\pi*ap}{\lambda}\sin(\Delta\varphi_1)\right)}{\frac{2\pi*ap}{\lambda}\sin(\Delta\varphi_1)}\right)^2\right] \quad (36)$$

}
If $\Delta\overline{\omega}_i$=0, then
{
$\Delta D_i$=0
else $$\Delta D_i = 10*\log\left[\left(\frac{\sin\left(\frac{2\pi*ap}{\lambda}\sin(\Delta\varphi_i)\right)}{\frac{2\pi*ap}{\lambda}\sin(\Delta\varphi_i)}\right)^2\right] \quad (37)$$

}
inc=inc+1
diff_power$_i$=$\Delta D_i$−$\Delta D_1$
if (diff_power$_i$>max$_i$_power_level)
{

$$\text{increment}_1=-1/2^{inc} \quad (38)$$

else $$\text{increment}=1/2^{inc} \quad (39)$$

}
} END WHILE LOOP

In the above WHILE loop, the estimated relative signal strengths are calculated as a function of an antenna pattern approximation equation. The antenna pattern equation is represented in Eqs. 36–37. Eqs. 36–37 rely on a sin(x)/x approximation of the antenna pattern, where $$x = \frac{2\pi * ap}{\lambda} \sin(\Delta\varphi);$$

ap=4.5 m is the aperture of the satellite; and λ=0.2 m is the wavelength of the carrier. However other mathematical expressions can be used to model the attenuation pattern of the antenna, such as a Taylor series, a Bessel function, or any other suitable pattern approximation equation.

The variables $H_1$, $H_i$, $H_{fixed}$, $\Delta_1$, $\Delta_i$, $\Delta\phi_1$, and $\Delta\phi_i$ are graphically represented in FIG. 12.

After the WHILE loop has completed its execution for both $axis_2$ and $axis_3$, the following equations are used to calculate the coordinates ($y_{new}'''$, $z_{new}'''$) of the UT in the 2-D plane.

{

$$y'''_{new}=(z'''_2*y'''_3*y'''_{u3}+z'''_{u3}*z'''_2*z'''_3-y'''_2*z'''_3*y'''_{u2}-z'''_{u2}*z'''_2*z'''_3)/(z'''_2*y'''_3-y'''_2*z'''_3) \quad (40)$$

$$z'''_{new}=((y'''_2/z'''_2)*(y'''_{u2}-y'''_{new}))+z'''_{u2} \quad (41)$$

}

Once the user terminal position has been determined on the 2-D plane, the coordinates of this location are mapped back on the surface of the earth. This mapping process is illustrated by the method 90 shown in FIG. 6. The method 90 describes the three steps required to map back the coordinates of the estimated user terminal position on the surface of the earth.

In step 92, the UT coordinates are translated such that the center spot beam, spot $beam_1$, which was located at the center of the plane, is returned to its original location on the 2-D plane:

$$x''_{new}=x''_1+R \quad (42)$$

$$y''_{new}=y'''_{new}+y''_1 \quad (43)$$

$$z''_{new}=z'''_{new}+z''_1 \quad (44)$$

In step 94, the UT coordinates are translated from the 2-D plane back to the surface of the earth:

$$x'_{new} = \frac{-B \pm \sqrt{B^2 - 4*A*C}}{2*A} \quad (45)$$

where $$A = 1 + \left(\frac{y''_{new}}{H}\right)^2 * \left(1 + \left(\frac{z''_{new}}{y''_{new}}\right)^2\right) \quad (46)$$

$$B = -2*(R+H)*\left(\frac{y''_{new}}{H}\right)^2 * \left(1 + \left(\frac{z''_{new}}{y''_{new}}\right)^2\right) \quad (47)$$

$$C = (R+H)^2 * \left(\frac{y''_{new}}{H}\right)^2 * \left(1 + \left(\frac{z''_{new}}{y''_{new}}\right)^2\right) - R^2 \quad (48)$$

$$y'_{new} = (R+H-x'_{new}) * \left(\frac{y''_{new}}{H}\right) \quad (49)$$

$$z'_{new} = \left(\frac{z''_{new}}{y''_{new}}\right) * y'_{new} \quad (50)$$

where R=6378 km and H=35787 km.

In step 96, the earth-centered coordinated system is rotated away from the satellite radius to its original orientation. This is accomplished by rotating the center spot beam coordinates by $\theta_{sat}$ and $\Psi_{sat}$ such that the satellite is returned to its original location:

$$x_{new}=((x'_{new}\cos(\psi_{sat})-z'_{new}\sin(\psi_{sat}))\cos(\theta_{sat}))-y'_{new}\sin(\theta_{sat}) \quad (51)$$

$$y_{new}=y'_{new}\cos(\theta_{sat})+((x'_{new}\cos(\psi_{sat})-z'_{new}\sin(\psi_{sat}))\sin(\theta_{sat})) \quad (52)$$

$$z_{new}=z'_{new}\cos(\psi_{sat})+x'_{new}\sin(\psi_{sat}) \quad (53)$$

Where $$\theta_{sat}=a\tan(y_{sat}/x_{sat}) \quad (54)$$

$$\psi_{sat}=a\tan(z_{sat}/\sqrt{x_{sat}^2+y_{sat}^2}) \quad (59)$$

The coordinates of the estimated user terminal position on the surface of the earth are $x_{new}$, $y_{new}$ and $z_{new}$.

Figure 6:
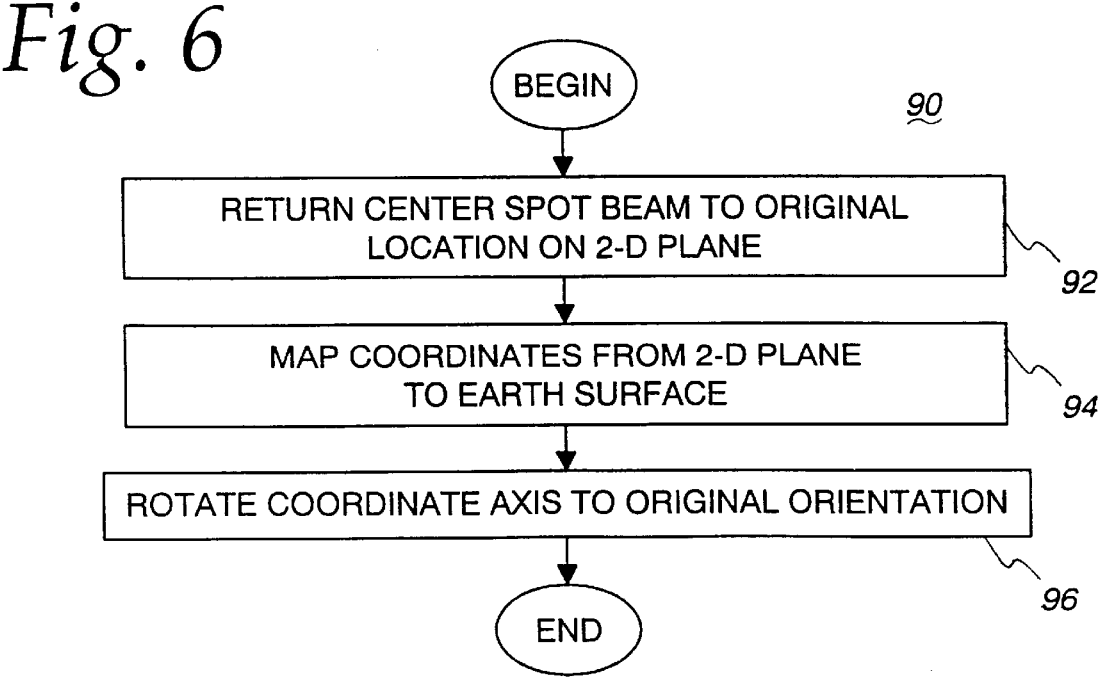

The steps shown in FIGS. 4–6 can be repeated for one to twelve combinations of three spot beams, depending on the number of neighbors in the cluster. Using more than one spot beam combination, the final estimated user terminal position can be the average of the estimated position ($x_{new}$, $y_{new}$, $z_{new}$) from each combination of three spot beams.

The estimated UT position can then be translated to a GPS coordinate format and provided to the GPS receiver 29 as an initial position estimate. This greatly speeds the GPS acquisition time when an initial GPS position estimate is otherwise unavailable. In addition, the estimated UT position can be used by the UT or satellite system to determine the communication delay time between the UT and satellite.

While specific embodiments of the present invention have been shown and described, it will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A method of estimating the location of a terrestrial-based terminal, comprising:

measuring relative signal strengths between a center spot beam and a plurality of neighboring spot beams emitted from a satellite in a substantially geosynchronous orbit;

deriving the locations of the center and neighboring spot beams from a pilot signal emitted from the satellite;

deriving the location of the satellite from the pilot signal;

generating a plurality of estimated relative signal strengths based on the locations of the satellite and the spot beams;

estimating the location of the terminal by comparing the estimated relative signal strengths and the measured relative strengths; and providing the estimated terminal location to a global positioning system (GPS) as an initial location.

2. A system for estimating position, comprising:

at least one satellite in a substantially geosynchronous orbit emitting a plurality of spot beams and a terrestrial-based terminal comprising a receiver generating a plurality of measured relative signal strengths in response to the spot beams, a processor operatively coupled to the receiver, wherein the processor provides the estimated terminal position as an initial GPS location and a memory, operatively coupled to the processor, storing a set of instructions directing the processor to estimate the position of the terminal based on the measured relative signal strengths.

* * * * *